(12) United States Patent
Mizushima et al.

(10) Patent No.: US 11,705,844 B2
(45) Date of Patent: Jul. 18, 2023

(54) MOTOR CONTROL DEVICE, MOTOR, AND MOTOR CONTROL METHOD

(71) Applicant: Nidec Corporation, Kyoto (JP)

(72) Inventors: Hiroaki Mizushima, Kyoto (JP); Shuji Endo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/562,213

(22) Filed: Dec. 27, 2021

(65) Prior Publication Data

US 2022/0209696 A1 Jun. 30, 2022

(30) Foreign Application Priority Data

Dec. 28, 2020 (JP) ................. 2020-219051

(51) Int. Cl.
*H02P 21/00* (2016.01)
*H02P 21/22* (2016.01)

(52) U.S. Cl.
CPC ................... *H02P 21/22* (2016.02)

(58) Field of Classification Search
CPC ...................................... H02P 21/22
USPC .................................... 318/400.02
See application file for complete search history.

(56) References Cited

U.S. PATENT DOCUMENTS

| 2009/0052215 | A1* | 2/2009 | Watanabe | H02M 7/53873 |
| | | | | 363/131 |
| 2013/0264974 | A1* | 10/2013 | Suzuki | H02P 27/08 |
| | | | | 318/139 |
| 2016/0134214 | A1* | 5/2016 | Nakao | H02P 27/08 |
| | | | | 318/400.32 |
| 2017/0163199 | A1* | 6/2017 | Park | H02P 21/18 |
| 2020/0086910 | A1 | 3/2020 | Hirata et al. | |
| 2020/0252012 | A1* | 8/2020 | Hidaka | H02P 29/0241 |
| 2020/0382042 | A1* | 12/2020 | Nakayama | H02P 23/14 |
| 2022/0149766 | A1* | 5/2022 | Park | H02P 27/06 |

\* cited by examiner

*Primary Examiner* — Erick D Glass
(74) *Attorney, Agent, or Firm* — Keating & Bennett (57) ABSTRACT

A motor control device includes a controller to control a three-phase current by feeding back a control current value obtained based on the three-phase current. The controller is configured or programmed to execute first feedback control of feeding back any one of a first control current value calculated based on a second phase current and the third phase current, a second control current value calculated based on the third phase current and a first phase current, and a third control current value calculated based on the first phase current and the second phase current as a control current value and second feedback control in which the first control current value, the second control current value, and the third control current value are switched and fed back as the control current value.

8 Claims, 6 Drawing Sheets

S100 Duty ratio Du is greater than threshold TH?
S102 Set control current value to first control current value Ic1
S104 Duty ratio Dv is greater than threshold TH?
S106 Set control current value to second control current value Ic2
S108 Duty ratio Dw is greater than threshold TH?
S110 Set control current value to third control current value Ic3
S112 Set control current value to first control current value Ic1

MOTOR CONTROL DEVICE, MOTOR, AND MOTOR CONTROL METHOD

CROSS-REFERENCE TO RELATED APPLICATIONS

The present invention claims priority under 35 U.S.C. § 119 to Japanese Patent Application No. 2020-219051, filed on Dec. 28, 2020, the entire contents of which are hereby incorporated herein by reference.

1. Field of the Invention

The present disclosure relates to a motor control device, a motor, and a motor control method.

2. Background

A method for controlling a motor by adjusting a three-phase current supplied to the motor is known. For example, a method for controlling a motor by pulse width modulation (PWM) control is known.

In the motor control device as described above, sometimes a phase current generated in the PWM control is detected by a detection element such as a shunt resistor to control a control current value. However, when a duty ratio of a pulse wave increases, current detection time by the detection element such as the shunt resistor is shortened, which causes a problem in that current detection accuracy by the detection element is lowered. For this reason, sometimes the control current value is not suitably controlled. Thereby, the duty ratio of the pulse wave cannot be increased to a certain extent or more, and there is a problem in that the output of the motor is not sufficiently improved.

SUMMARY

One example embodiment of the present disclosure is a motor control device that controls a motor by adjusting a three-phase current including a first phase current, a second phase current, and a third phase current. The motor control device includes a controller to control the three-phase current by feeding back a control current value obtained based on the three-phase current. The controller is configured or programmed to execute a first feedback control of feeding back any one of a first control current value calculated based on the second phase current and the third phase current, a second control current value calculated based on the third phase current and the first phase current, and a third control current value calculated based on the first phase current and the second phase current as a control current value and a second feedback control in which the first control current value, the second control current value, and the third control current value are switched and fed back as the control current value.

Another example embodiment of the present disclosure is a motor including the motor control device.

Still another example embodiment of the present disclosure is a motor control method to control a motor by adjusting a three-phase current including a first phase current, a second phase current, and a third phase current. The motor control method includes controlling the three-phase current by feeding back a control current value obtained based on the three-phase current. The controlling the three-phase current includes executing first feedback control of feeding back any one of a first control current value calculated based on the second phase current and the third phase current, a second control current value calculated based on the third phase current and the first phase current, and a third control current value calculated based on the first phase current and the second phase current as a control current value and second feedback control in which the first control current value, the second control current value, and the third control current value are switched and fed back as the control current value.

The above and other elements, features, steps, characteristics and advantages of the present disclosure will become more apparent from the following detailed description of the example embodiments with reference to the attached drawings.

DETAILED DESCRIPTION

Hereinafter, example embodiments of motor control devices, motors, motor control methods, and a non-transitory computer-readable media including programs according to the present disclosure will be described with reference to the drawings.

Figure 1:
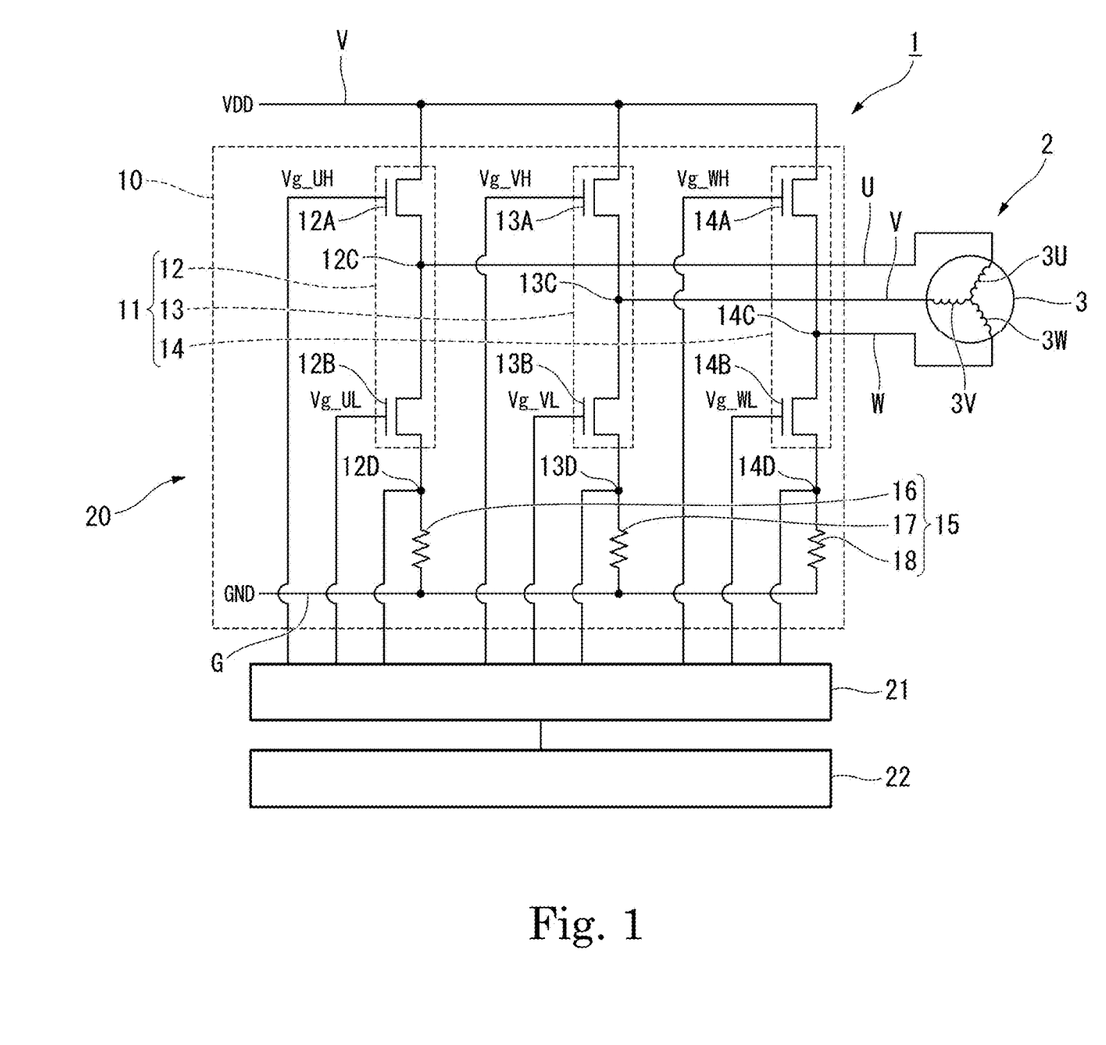
FIG. 1 is a view illustrating a configuration of a motor according to an example embodiment of the present disclosure.

As illustrated in FIG. 1, for example, a motor 1 is a three-phase brushless motor to which a three-phase alternating current is supplied. The motor 1 includes a motor body 2 and a motor control device 20 that controls the motor body 2. The motor body 2 includes a rotor (not illustrated) and a stator 3. The stator 3 includes a U-phase coil 3U, a V-phase coil 3V, and a W-phase coil 3W. In the example embodiment, the motor control device 20 controls the motor body 2 by PWM control. As illustrated in FIG. 1, the motor control device 20 includes an inverter circuit unit 10, a controller 21, and a storage 22. Although not illustrated, the motor control device 20 includes an acquisition unit that acquires each detection value, a command value, and the like. The storage 22 stores the detection value, the command value, and data such as a program related to control.

The inverter circuit unit 10 is controlled by the controller 21 and generates a control current driving the motor body 2. In the example embodiment, the control current generated by the inverter circuit unit 10 is an alternating current, and is a three-phase current including a first phase current, a second phase current, and a third phase current. For example, the inverter circuit unit 10 generates a three-phase control signal including a U-phase signal, a V-phase signal, and a W-phase signal. Each generated signal is an AC signal. As illustrated in FIG. 1, the inverter circuit unit 10 includes a switching unit 11 that generates the three-phase control signal. In the example embodiment, the switching unit 11 includes three switching units 12, 13, 14. Because the switching units 12, 13, 14 have the same configuration, the switching units 12, 13, 14 are referred to as the switching unit 11 unless otherwise distinguished.

The three-phase control signals generated by the inverter circuit unit 10 are input to the motor body 2 to drive the motor body 2. In addition, the inverter circuit unit 10 includes a shunt resistor 15. In the example embodiment, the shunt resistor 15 includes three shunt resistors 16, 17, 18. Because the shunt resistors 16, 17, 18 have the same configuration, the shunt resistors 16, 17, 18 are referred to as the shunt resistor 15 unless otherwise distinguished.

For example, each of the switching units 11 includes two switching elements connected in series between a power supply line V and a GND line G, and generates an AC signal driving the motor body 2.

The switching unit 12 generates a U-phase signal among the three-phase AC signals. The switching unit 12 supplies the generated U-phase signal to the motor body 2 as a drive signal. The switching unit 12 includes a high-side switching element 12A and a low-side switching element 12B connected in series to the switching element 12A. An upstream side of the switching element 12A is connected to the power supply line V. A downstream side of the switching element 12B is connected to the GND line G through the shunt resistor 16 connected in series. The U-phase coil 3U of the motor body 2 is electrically connected between the switching element 12A and the switching element 12B.

For example, the switching element 12A and the switching element 12B include an insulated gate bipolar transistor (IGBT) with a free wheeling diode (FWD), a metal oxide semiconductor field effect transistor (MOSFET), or a power transistor. A control signal (gate voltage) output from the controller 21 is input to a gate terminal of each of the switching elements 12A, 12B. A U-phase high-side gate voltage (Vg_UH) is input to the switching element 12A. A U-phase low-side gate voltage (Vg_UL) is input to the switching element 12B. When the gate voltage higher than or equal to a predetermined threshold is input to each of the switching elements 12A, 12B, each of the switching elements 12A, 12B is turned on.

Each of the switching elements 12A, 12B is switched between an on state and an off state by controlling the gate voltage input from the controller 21, whereby the switching is controlled. A U-phase signal generated by the switching control is output from a node 12C between the switching element 12A and the switching element 12B. The U-phase signal is a pulse signal in which the duty ratio is adjusted according to the output. When the U-phase signal is input to the U-phase coil 3U of the motor body 2, a sinusoidal current flows through the U-phase coil 3U.

The switching unit 13 generates a V-phase signal among the three-phase AC signals. The switching unit 13 supplies the generated V-phase signal to the stator 3 as a drive signal. The switching unit 13 has a configuration similar to that of the switching unit 12. The switching unit 13 includes a high-side switching element 13A, a low-side switching element 13B, and the shunt resistor 17. The V phase of the stator 3 is connected between the switching element 13A and the switching element 13B.

A V-phase high-side gate voltage (Vg_VH) is input to the switching element 13A, and the switching element 13A is turned on. A V-phase low-side gate voltage (Vg_VL) is input to the switching element 13B, and the switching element 13B is turned on.

A V-phase signal generated by the switching control is output from a node 13C between the switching element 13A and the switching element 13B. When the V-phase signal is input to a V-phase coil 3V of the stator 3, a sinusoidal current flows through the V-phase coil 3V.

The switching unit 14 generates a W-phase signal among the three-phase AC signals. The switching unit 14 has the same configuration as the switching units 12, 13. The switching unit 14 supplies the generated W-phase signal to the stator 3 as a drive signal. The switching unit 14 includes a high-side switching element 14A, a low-side switching element 14B, and the shunt resistor 18. The W phase of the stator 3 is connected between the switching element 14A and the switching element 14B.

A W-phase high-side gate voltage (Vg_WH) is input to the switching element 14A, and the switching element 14A is turned on. A W-phase low-side gate voltage (Vg_WL) is input to the switching element 14B, and the switching element 14B is turned on.

A W-phase signal generated by the switching control is output from the node 14C between the switching element 14A and the switching element 14B. When the W-phase signal is input to the W-phase coil 3W of the stator 3, a sinusoidal current flows through the W-phase coil 3W.

When the high-side switching elements 12A, 13A, 14A are driven, the current does not simultaneously flow through the low-side switching elements 12B, 13B, 14B and the shunt resistor 15.

The shunt resistor 15 is a resistance element that can detect the current flowing through the switching unit 11 by measuring an inter-terminal voltage. When the switching elements 12A, 13A, 14A on the high side are turned off, the shunt resistor 15 can detect a value of current flowing through the switching elements 12B, 13B, 14B provided on the low side that becomes in the on state. That is, according to the shunt resistor 15, the value of the current flowing through the switching elements 12B, 13B, 14B can be detected, and off-state time in one cycle of a pulse wave that becomes the control signal can be detected.

For example, the shunt resistor 16 is disposed between the switching unit 12 and the GND line G. The shunt resistor 16 is disposed between the switching unit 12 and the GND line, and can detect a U-phase voltage. A U-phase first phase current can be calculated from the detection value of the voltage obtained based on the shunt resistor 16. A node 12D serving as a detection terminal is disposed between the switching unit 12 and the shunt resistor 16.

For example, the shunt resistor 17 is disposed between the switching unit 13 and the GND line G. The shunt resistor 17 is disposed between the switching unit 13 and the GND line, and can detect a V-phase voltage. A V-phase second phase current can be calculated from the detection value of the voltage obtained based on the shunt resistor 17. A node 13D serving as a detection terminal is disposed between the switching unit 13 and the shunt resistor 17.

For example, the shunt resistor 18 is disposed between the switching unit 14 and the GND line G. The shunt resistor 18 is disposed between the switching unit 14 and the GND line, and can detect a W-phase voltage. A W-phase third phase current can be calculated from the detection value of the voltage obtained based on the shunt resistor 18. A node 14D serving as a detection terminal is disposed between the switching unit 14 and the shunt resistor 18.

Figure 2:
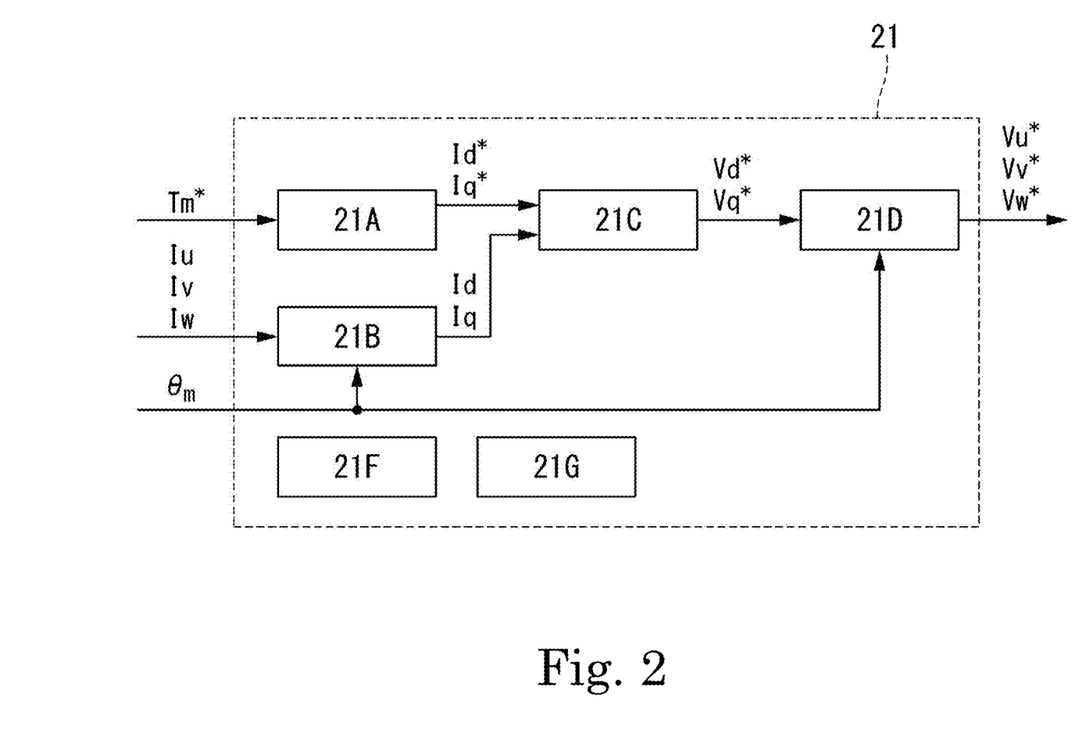
FIG. 2 is a block diagram illustrating a configuration of a controller according to an example embodiment of the present disclosure.

As illustrated in FIG. 2, for example, the controller 21 calculates a target current based on a command motor torque Tm output from a vehicle-side control device (not illustrated) and a motor electrical angle θm of the motor body 2, and controls the switching unit 11 to perform feedback control of the torque generated in the motor body 2. The motor control device 20 outputs a control current value (control signal) operating the switching unit 11 in the feedback control.

For example, the controller 21 adjusts the three-phase current including a first phase current Iu supplied to the U-phase coil 3U, a second phase current Iv supplied to the V-phase coil 3V, and a third phase current Iw supplied to the W-phase coil 3W, and feeds back the control current value obtained based on the three-phase current to control the motor 1.

As illustrated in FIG. 2, for example, the controller 21 includes a target current calculator 21A, a three-phase two-axis conversion unit 21B, a PI controller 21C, a two-axis three-phase conversion unit 21D, a PWM controller 21F, and a pre-driver 21G. In FIG. 2, the calculated value with an asterisk indicates a target value. The target current calculator 21A calculates a target current value of each phase current based on the command motor torque Tm that is a command value. In the example embodiment, the target current value is calculated as a value of a dq-axis current (described later). The PWM controller 21F generates a pre-driver drive signal of each phase for maintaining the motor torque at a desired target value, and outputs the pre-driver drive signal to the pre-driver 21G. The pre-driver 21G generates a driver drive signal of each phase by performing predetermined signal processing on the pre-driver drive signal of each phase input from the PWM controller 21F, and outputs the driver drive signal to the switching unit 11.

The three-phase values of the first phase current Iu, the second phase current Iv, and the third phase current Iw obtained based on the shunt resistor 15 and the motor electrical angle θm of the motor body 2 are input to the three-phase two-axis conversion unit 21B. The three-phase two-axis conversion unit 21B calculates a value of the d-axis current Id obtained by converting the three-phase current into two axes of the d-axis in the motor body 2 and the q-axis in the motor body 2 and a value of the q-axis current Iq as control current values. The d-axis in the motor body 2 is an axis that faces the direction of a magnetic flux generated by a magnetic pole of a magnet provided in a rotor. The q-axis of the motor body 2 is an axis orthogonal to the d-axis. In the following description, the d-axis current Id and the q-axis current Iq are collectively referred to as dq-axis currents Id, Iq. Specifically, in the example embodiment, the three-phase two-axis conversion unit 21B applies the condition that a sum of the three-phase currents is zero, and calculates the value of the dq-axis current as the control current value based on any one of the following equations (1) to (3) using two phase currents of the three-phase currents and the motor electrical angle θm.

[Formula 1]

$$Ic1 = \begin{bmatrix} \mathrm{Id\_vw} \\ \mathrm{Iq\_vw} \end{bmatrix} = C_{32} \begin{bmatrix} -\sin(\theta_m + \frac{2}{3}\pi) & -\sin(\theta_m + \frac{\pi}{3}) \\ \sin(\theta_m + \frac{\pi}{6}) & -\sin(\theta_m + \frac{5}{6}\pi) \end{bmatrix} \begin{bmatrix} Iv \\ Iw \end{bmatrix} \quad (1)$$

$$Ic2 = \begin{bmatrix} \mathrm{Id\_wu} \\ \mathrm{Iq\_wu} \end{bmatrix} = C_{32} \begin{bmatrix} \sin\theta_m & -\sin(\theta_m + \frac{2}{3}\pi) \\ -\sin(\theta_m + \frac{\pi}{2}) & -\sin(\theta_m + \frac{\pi}{6}) \end{bmatrix} \begin{bmatrix} Iw \\ Iu \end{bmatrix} \quad (2)$$

-continued $$Ic3 = \begin{bmatrix} \mathrm{Id\_uv} \\ \mathrm{Iq\_uv} \end{bmatrix} = C_{32} \begin{bmatrix} \sin(\theta_m + \frac{\pi}{3}) & \sin\theta_m \\ -\sin(\theta_m + \frac{5}{6}\pi) & -\sin(\theta_m + \frac{\pi}{2}) \end{bmatrix} \begin{bmatrix} Iu \\ Iv \end{bmatrix} \quad (3)$$

However,

| [Formula 2] | |
|---|---|
| Iu/Iv/Iw | U/V/W phase current |
| Id_vw/Iq_vw | d/q-axis current (V/W phase) |
| Id_wu/Iq_wu | d/q-axis current (W/U phase) |
| Id_uv/Iq_uv | d/q-axis current (U/V phase) |
| θ$_m$ | Motor electrical angle |
| C$_{32}$ | Three-phase two-axis conversion coefficient |

The above equation (1) is an equation that calculates a first control current value Ic1. The first control current value Ic1 is a value of the dq-axis current calculated based on the second phase current Iv and the third phase current Iw. The above equation (2) is an equation that calculates a second control current value Ic2. The second control current value Ic2 is a value of the dq-axis current calculated based on the third phase current Iw and the first phase current Iu. The above equation (3) is an equation that calculates a third control current value Ic3. The third control current value Ic3 is a value of the dq-axis current calculated based on the first phase current Iu and the second phase current Iv.

The first control current value Ic1, the second control current value Ic2, and the third control current value Ic3 are current values that are theoretically the same. However, actually, because variations occur in the first phase current Iu, the second phase current Iv, and the third phase current Iw, the variations are generated in the control current values obtained from the two different phase currents. In the example embodiment, the three-phase two-axis conversion unit 21B calculates the variations generated in the control current values, namely, the values of the dq-axis currents as offset correction values Owu, Ouv based on the following equations (4), (5).

[Formula 3]

$$Owu = \begin{bmatrix} \mathrm{Id\_wu\_ofs} \\ \mathrm{Iq\_wu\_ofs} \end{bmatrix} = \begin{bmatrix} \mathrm{Id\_wu} - \mathrm{Id\_vw} \\ \mathrm{Iq\_wu} - \mathrm{Iq\_vw} \end{bmatrix} \quad (4)$$

$$Ouv = \begin{bmatrix} \mathrm{Id\_uv\_ofs} \\ \mathrm{Iq\_uv\_ofs} \end{bmatrix} = \begin{bmatrix} \mathrm{Id\_uv} - \mathrm{Id\_vw} \\ \mathrm{Iq\_uv} - \mathrm{Iq\_vw} \end{bmatrix} \quad (5)$$

However,

| [Formula 4] | |
|---|---|
| Id_wu_ofs/Iq_wu_ofs | d/q-axis current correction value (W, U phase) |
| Id_uv_ofs/Iq_uv_ofs | d/q-axis current correction value (U, W phase) |

The offset correction value Owu is a difference obtained by subtracting the first control current value Ic1 from the second control current value Ic2. For this reason, the second control current value Ic2 can be corrected to the same value as the first control current value Ic1 by subtracting the offset correction value Owu from the second control current value Ic2. The offset correction value Ouv is a difference obtained by subtracting the first control current value Ic1 from the third control current value Ic3. Therefore, the third control current value Ic3 can be corrected to the same value as the first control current value Ic1 by subtracting the offset correction value Ouv from the third control current value Ic3.

The target current value calculated by the target current calculator 21A and the control current value calculated by the three-phase two-axis conversion unit 21B, namely, the values of the dq-axis currents Id, Iq are input to the PI controller 21C. The PI controller 21 performs PI control on the target current value in order to feed back the control current value calculated by the three-phase two-axis conversion unit 21B, namely, the values of the dq-axis currents Id, Iq. The control current value used as the value to be fed back in the PI controller 21 is any one of the first control current value Ic1, the second control current value Ic2, and the third control current value Ic3. The PI controller 21 calculates the dq-axis command voltages Vd, Vq based on the PI control.

The dq-axis command voltages Vd, Vq calculated by the PI controller 21C and the motor electrical angle θm are input to the two-axis three-phase conversion unit 21D. The two-axis three-phase conversion unit 21D calculates three-phase command voltages Vu, Vv, Vw based on the dq-axis command voltages Vd, Vq and the motor electrical angle θm. The three-phase command voltages Vu, Vv, Vw are input to the inverter circuit unit 10. Each switching unit 11 of the inverter circuit unit 10 is controlled by the command voltages Vu, Vv, Vw input to the inverter circuit unit 10, and the three-phase current supplied to the motor body 2 is adjusted.

A control method by the controller 21 will be described below. The controller 21 can execute first feedback control and second feedback control in the PI controller 21.

The first feedback control is feedback control in which any one of the first control current value Ic1, the second control current value Ic2, and the third control current value Ic3 is fed back as the control current value. In the first feedback control of the example embodiment, the controller 21 feeds back the first control current value Ic1 as the control current value. In the first feedback control, the controller 21 does not use other control current values, namely, the second control current value Ic2 and the third control current value Ic3, as the control current value to be fed back. In the example embodiment, the controller 21 executes the first feedback control when the duty ratios of the pulse waves that respectively generate the first phase current Iu, the second phase current Iv, and the third phase current Iw change within a range less than or equal to a predetermined threshold TH.

In the example embodiment, the controller 21 calculates the first control current value Ic1, the second control current value Ic2, and the third control current value Ic3 during the execution of the first feedback control, and acquires a difference between the control current values. Specifically, during the execution of the first feedback control, the controller 21 acquires the offset correction values Ouv, Owu as differences between the control current values using, for example, the equations (4), (5).

The second feedback control is feedback control in which the first control current value Ic1, the second control current value Ic2, and the third control current value Ic3 are switched and fed back as the control current value. In the example embodiment, the controller 21 executes the second feedback control when at least one of duty ratios DR of the pulse waves that generate the first phase current Iu, the second phase current Iv, and the third phase current Iw changes within a range including a value greater than the threshold TH.

Figure 3:
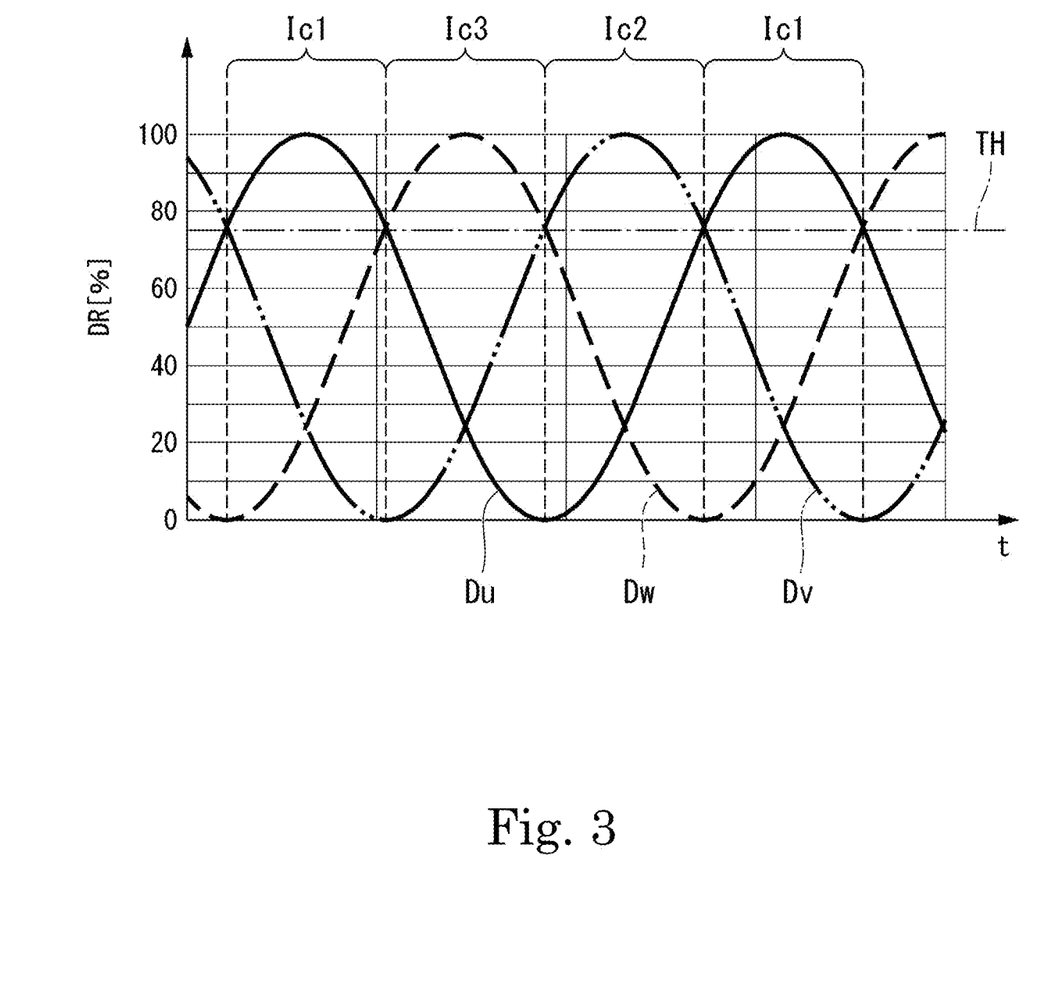
FIG. 3 is a view illustrating a generated control signal according to an example embodiment of the present disclosure.

FIG. 3 illustrates an example of a relationship between duty ratios Du, Dv, Dw of the pulse waves that generate the first phase current Iu, the second phase current Iv, and the third phase current Iw and time t. The duty ratio Du is the duty ratio DR of the pulse wave that generates the first phase current Iu. The duty ratio Dv is the duty ratio DR of the pulse wave that generates the second phase current Iv. The duty ratio Dw is the duty ratio DR of the pulse wave that generates the third phase current Iw. The change of each of the duty ratios Du, Dv, Dw to the time t has the same waveform as the change of the value of each phase current to the time t. For example, the waveforms of the duty ratios Du, Dv, Dw are sine waves in which phases are shifted from each other. The waveforms of the duty ratios Du, Dv, Dw may be three-phase waveforms in which phases are shifted from each other by neutral point modulation. The example of FIG. 3 illustrates the case where all of the duty ratios Du, Dv, Dw change within a range of 0% to 100%.

In the example of FIG. 3, the predetermined threshold TH is a higher value of the values of the duty ratio DR at a point where the waveforms of the two duty ratios DR intersect each other in the duty ratios Du, Dv, Dw. For this reason, the duty ratio DR that becomes greater than the threshold TH in the duty ratios Du, Dv, Dw is one or less at any time t. The example of FIG. 3 illustrates the case where the duty ratios Du, Dv, Dw change to 100% that is the maximum value. For this reason, no matter how the changing ranges of the duty ratios Du, Dv, Dw change, the duty ratios DR greater than the threshold TH in the duty ratios Du, Dv, Dw exist only one or the less for each time t. In the example of FIG. 3, the threshold TH is 75%.

In the example embodiment, the controller 21 calculates the control current value based on the two-phase phase current value in which the duty ratio DR is less than or equal to the threshold TH in the three-phase currents in the second feedback control. That is, in the second feedback control, the controller 21 calculates the first control current value Ic1 based on the second phase current Iv and the third phase current Iw when the duty ratio Du is greater than the threshold TH and when the duty ratios Dv, Dw are less than or equal to the threshold TH. In the second feedback control, the controller 21 calculates the second control current value Ic2 based on the third phase current Iw and the first phase current Iu when the duty ratio Dv is greater than the threshold TH and when the duty ratios Dw, Du are less than or equal to the threshold TH. In the second feedback control, the controller 21 calculates the third control current value Ic3 based on the first phase current Iu and the second phase current Iv when the duty ratio Dw is greater than the threshold TH and when the duty ratios Du, Dv are less than or equal to the threshold TH.

In the second feedback control, the controller 21 switches the fed-back control current value based on the change in the duty ratio DR of each pulse wave that generates the first phase current Iu, the second phase current Iv, and the third phase current Iw. In the second feedback control of the example embodiment, the control current value is switched when each of the duty ratios Du, Dv, Dw that change with time t exceeds the threshold TH.

That is, for example, in the second feedback control, when the duty ratio Dw exceeds the threshold TH in the state where the first control current value Ic1 is used for the feedback as the control current value, the controller 21 switches the control current value from the first control current value Ic1 to the third control current value Ic3. In the second feedback control, when the duty ratio Dv exceeds the threshold TH in the state where the third control current value Ic3 is used for the feedback as the control current value, the controller 21 switches the control current value from the third control current value Ic3 to the second control current value Ic2. In the second feedback control, when the duty ratio Du exceeds the threshold TH in the state where the second control current value Ic2 is used for the feedback as the control current value, the controller 21 switches the control current value from the second control current value Ic2 to the first control current value Ic1.

In the example embodiment, the controller 21 corrects the control current value based on the difference between the first control current value Ic1, the second control current value Ic2, and the third control current value Ic3 in the second feedback control. Specifically, in the second feedback control, the controller 21 corrects two control current values that are not used in the first feedback control among the first control current value Ic1, the second control current value Ic2, and the third control current value Ic3 to one control current value used in the first feedback control using the offset correction values Ouv, Owu. That is, when the second control current value Ic2 is calculated in the second feedback control, the controller 21 uses a value corrected by subtracting the offset correction value Owu from the calculated second control current value Ic2 as the control current value. When the third control current value Ic3 is calculated in the second feedback control, the controller 21 uses a value corrected by subtracting the offset correction value Ouv from the calculated third control current value Ic3 as the control current value. For example, the correction of the control current value using the offset correction values Ouv, Owu is performed in the three-phase two-axis conversion unit 21B.

Figure 4:
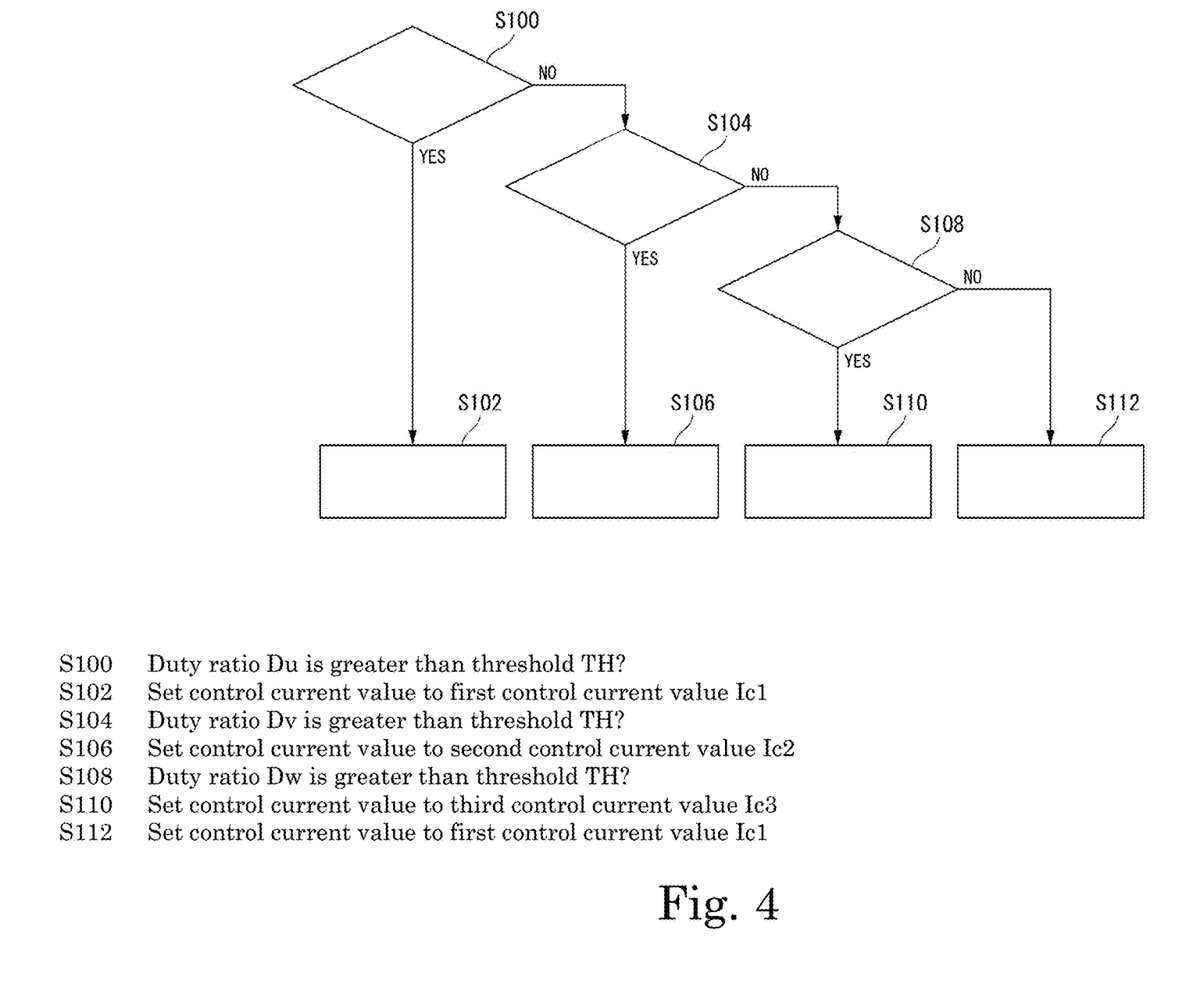
FIG. 4 is a flowchart illustrating processing executed in a motor control device according to an example embodiment of the present disclosure.

For example, the controller 21 can execute each feedback control corresponding to the change in the duty ratios Du, Dv, Dw by performing the control according to the flowchart illustrated in FIG. 4. As illustrated in FIG. 4, first, the controller 21 determines whether or not the duty ratio Du is greater than the threshold TH (step S100). When the duty ratio Du is greater than the threshold TH (YES in step S100), the controller 21 sets the control current value used for the feedback control to the first control current value Ic1 (step S102). When the duty ratio Du is less than or equal to the threshold TH (NO in step S100), the controller 21 determines whether or not the duty ratio Dv is greater than the threshold TH (step S104).

When the duty ratio Dv is greater than the threshold TH (YES in step S104), the controller 21 sets the control current value used for the feedback control to the second control current value Ic2 (step S106). When the duty ratio Dv is less than or equal to the threshold TH (NO in step S104), the controller 21 determines whether or not the duty ratio Dw is greater than the threshold TH (step S108).

When the duty ratio Dw is greater than the threshold TH (YES in step S108), the controller 21 sets the control current value used for the feedback control to the third control current value Ic3 (step S110). When the duty ratio Dw is less than or equal to the threshold TH (NO in step S108), the controller 21 sets the control current value used for the feedback control to the first control current value Ic1 (step S112).

The controller 21 can execute the first feedback control and the second feedback control according to the magnitudes of the duty ratios Du, Dv, Dw by constantly repeating steps S100 to S112. In the example embodiment, the case where step S112 is executed is the case where the first feedback control is executed. The case where steps S102, S106, S110 are periodically switched and executed is the case where the second feedback control is executed.

Figure 5:
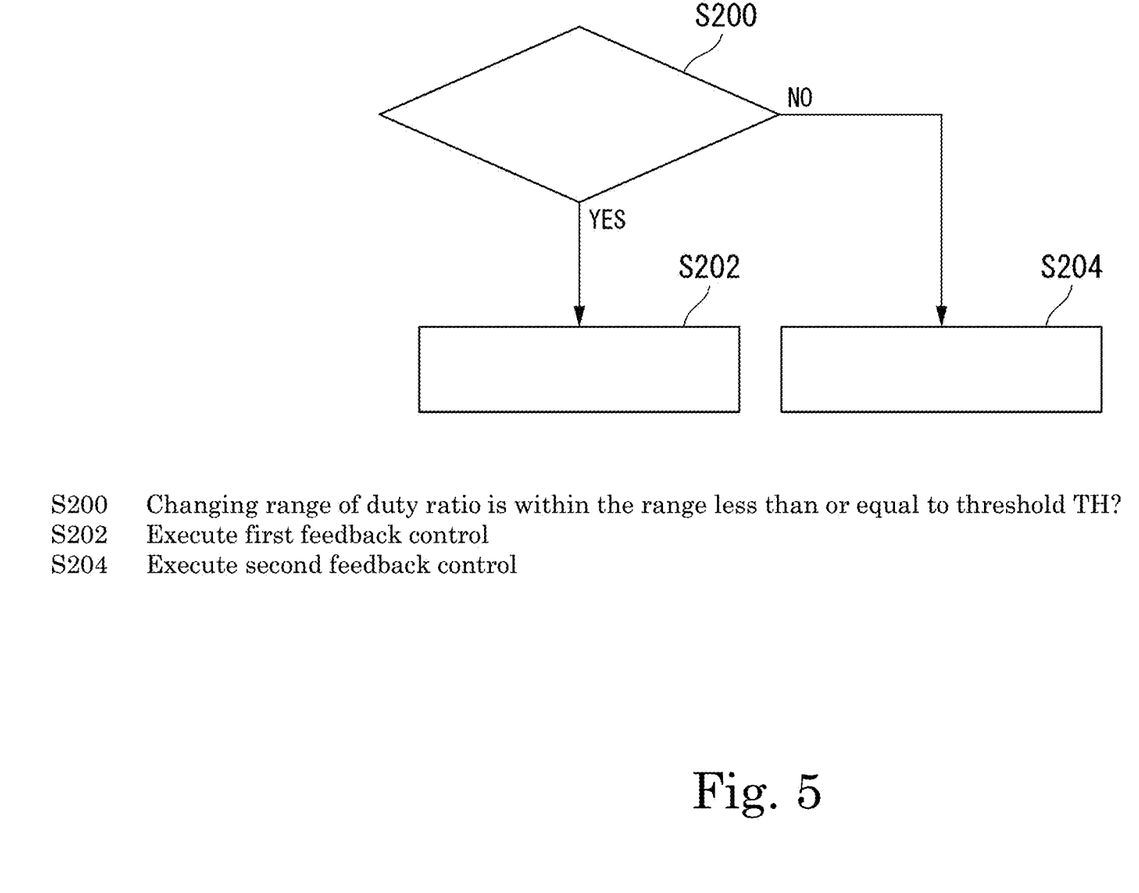
FIG. 5 is a flowchart illustrating processing of another determination method according to an example embodiment of the present disclosure.

For example, the controller 21 may execute each feedback control corresponding to the change in the duty ratios Du, Dv, Dw by performing the control according to the flowchart in FIG. 5. In the example of FIG. 5, the controller 21 determines whether the changing ranges of the duty ratios Du, Dv, Dw of the respective pulses that generate the first phase current Iu, the second phase current Iv, and the third phase current Iw are within the range less than or equal to the threshold TH (step S200).

When the changing ranges of the duty ratios Du, Dv, Dw are within the range less than or equal to the threshold TH (YES in step S200), the controller 21 executes the first feedback control (step S202). On the other hand, when the changing ranges of the duty ratios Du, Dv, Dw are not within the range less than or equal to the threshold TH (NO in step S200), the controller 21 executes the second feedback control (step S204).

As described above, the motor control method for controlling the motor 1 of the example embodiment is a motor control method for adjusting the three-phase current including the first phase current Iu, the second phase current Iv, and the third phase current Iw, and includes the control of the three-phase current by feeding back the control current value obtained based on the three-phase current. The control of the three-phase current in the motor control method includes the execution of the first feedback control in which any one of the first control current value Ic1 calculated based on the second phase current Iv and the third phase current Iw, the second control current value Ic2 calculated based on the third phase current Iw and the first phase current Iu, and the third control current value Ic3 calculated based on the first phase current Iu and the second phase current Iv is fed back as the control current value. The control of the three-phase current in the motor control method includes the execution of the second feedback control in which the first control current value Ic1, the second control current value Ic2, and the third control current value Ic3 are switched and fed back as the control current values.

In the motor control device 20 that controls the motor in the above processing, the program adjusts the three-phase current including the first phase current Iu, the second phase current Iv, and the third phase current Iw, and causes the processing related to the motor control method to be executed. The program causes the motor control device 20 to control the three-phase current by feeding back the control current value obtained based on the three-phase current.

When the three-phase current is controlled, the program causes the motor control device 20 to execute the first feedback control that feeds back any one of the first control current value Ic1 calculated based on the second phase current Iv and the third phase current Iw, the second control current value Ic2 calculated based on the third phase current Iw and the first phase current Iu, and the third control current value Ic3 calculated based on the first phase current Iu and the second phase current Iv as the control current value.

When the three-phase current is controlled, the program causes the motor control device 20 to execute the second feedback control in which the first control current value Ic1, the second control current value Ic2, and the third control current value Ic3 are switched and fed back as the control current values.

As described above, according to the motor control device 20, the controller 21 can execute the second feedback control in which the first control current value Ic1, the second control current value Ic2, and the third control current value Ic3 are switched and fed back as the control current values. Accordingly, even when the duty ratios Du, Dv, Dw change to the range in which the current value cannot be suitably detected due to the shunt resistor 15 or the like, two phase currents in which the values of the duty ratios Du, Dv, Dw are values capable of suitably detecting the current value can be selected when the control current value is detected, and the control current value can be calculated based on the two phase currents. Thus, for example, even when the duty ratios Du, Dv, Dw change within a range including relatively large values such as 90% or more and 100% or less, the control current value can be accurately calculated, and the motor 1 can be suitably controlled. The range of the threshold is set in a range in which the three-phase current in the inverter circuit unit 10 is hardly accurately detected. Accordingly, the range of the threshold changes depending on the configuration of the inverter circuit unit 10 and the like. The switching of the feedback control can be suitably performed for each inverter circuit unit 10 by appropriately determining the threshold according to an individual characteristic of the inverter circuit unit 10. Consequently, the duty ratios Du, Dv, Dw of the pulse waves that generate the three-phase currents supplied to the motor 1 can be increased, and the output of the motor 1 can be improved. In addition, the output of the motor 1 can be improved by changing a program causing the motor control device 20 to execute the processing without changing the structure of the existing motor 1.

Furthermore, according to the example embodiment, the controller 21 executes the first feedback control when the duty ratios Du, Dv, Dw of the pulse waves that generate the first phase current Iu, the second phase current Iv, and the third phase current Iw change within the range less than or equal to the predetermined threshold TH, and the controller 21 executes the second feedback control when at least one of the duty ratios Du, Dv, Dw of the pulse waves that generate the first phase current Iu, the second phase current Iv, and the third phase current Iw changes within the range including the value greater than the threshold TH. Accordingly, for example, when the threshold TH is set to the maximum value of the duty ratio DR at which the current value can be suitably detected, the control current value used for the feedback can be suitably switched by executing the second feedback control when the duty ratios Du, Dv, Dw change to values at which the current value cannot be suitably detected. When the duty ratios Du, Dv, Dw do not change to values at which the current value cannot be suitably detected, the first feedback control that does not change the control current value is executed, so that the control load of the controller 21 can be reduced.

According to the example embodiment, the control current value is a value of the dq-axis current obtained by converting the three-phase current in the two axes of the d-axis and the q-axis orthogonal to the d-axis. Accordingly, the rotational position of the rotor in the motor body 2 can be easily grasped by calculating the control current value. Thus, the motor 1 can be efficiently controlled using the control current value.

In addition, according to the example embodiment, the controller 21 calculates the control current value based on the two-phase current values in which the duty ratios Du, Dv, Dw are less than or equal to the threshold TH in the three-phase currents in the second feedback control. Accordingly, both the two-phase phase current values can be suitably detected, and the control current value can be suitably calculated based on the two-phase current values.

According to the example embodiment, in the second feedback control, the controller 21 corrects the control current value based on the difference between the first control current value Ic1, the second control current value Ic2, and the third control current value Ic3. Accordingly, discontinuity of the control current value can be prevented when the control current value is switched among the first control current value Ic1, the second control current value Ic2, and the third control current value Ic3. Specifically, in the example embodiment, because the second control current value Ic2 and the third control current value Ic3 are corrected to the first control current value Ic1 by the offset correction values Ouv, Owu, the control current value can be continuously changed similarly to the first control current value in the first feedback control even when the control current value is switched in the second feedback control. Consequently, the motor 1 can be more suitably controlled using the control current value.

According to the example embodiment, the controller 21 calculates the first control current value Ic1, the second control current value Ic2, and the third control current value Ic3 during the execution of the first feedback control, and acquires the difference between the first control current value Ic1, the second control current value Ic2, and the third control current value Ic3. That is, when the changing ranges of the duty ratios Du, Dv, Dw are within the range in which all of the first phase current Iu, the second phase current Iv, and the third phase current Iw can be suitably detected, the first control current value Ic1, the second control current value Ic2, and the third control current value Ic3 can be detected with high accuracy, and variations in the control current values can be acquired with high accuracy. Thus, when the second feedback control is executed, the control current value can be suitably corrected using the difference acquired during the first feedback control. Consequently, the discontinuity of the control current value can be further prevented, and the motor 1 can be more suitably controlled.

Figure 6:
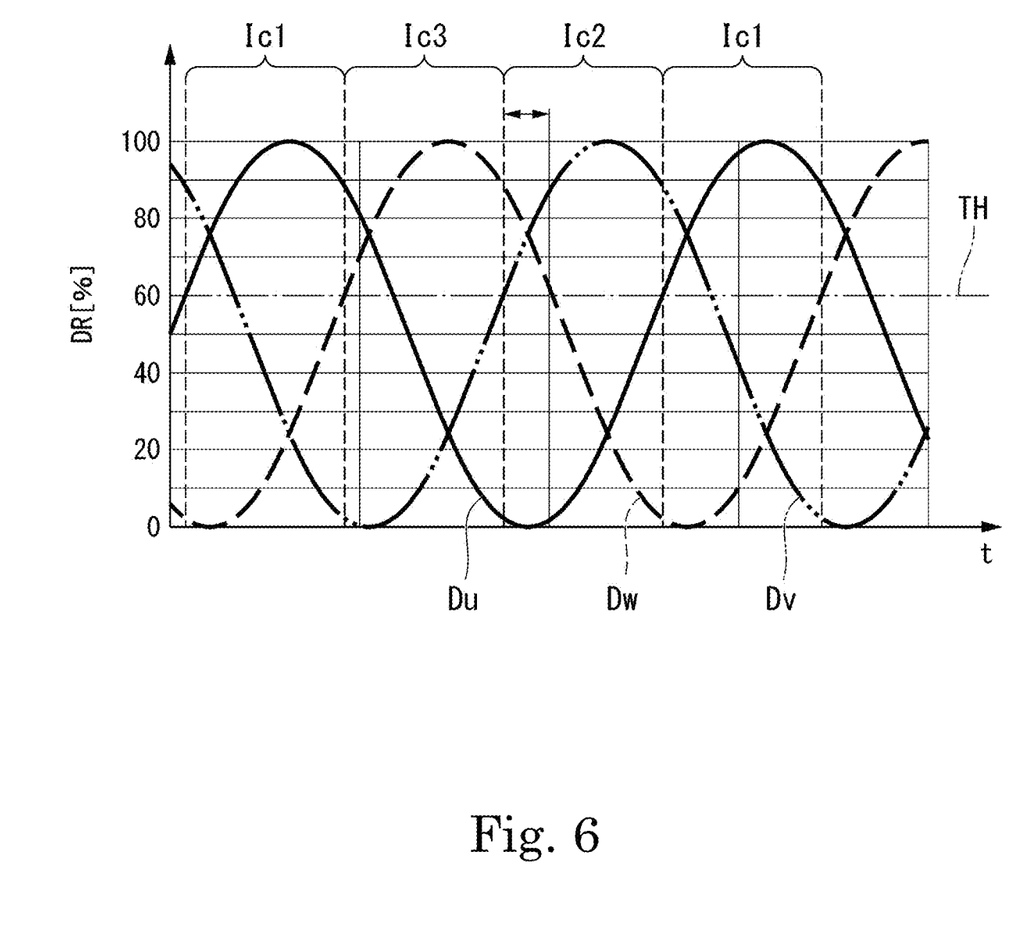
FIG. 6 is a view illustrating a method to set a threshold of a control signal according to a modification of an example embodiment of the present disclosure.

In the above example embodiment, the threshold TH is a value at which the duty ratios Du, Dv, Dw that are greater than the threshold TH are one or less at any time t, but the present disclosure is not limited thereto. The threshold TH may be a value as in the example of FIG. 6. In the example of FIG. 6, the threshold TH is smaller than the larger value of the values of the duty ratio DR at the point where the waveforms of the two duty ratios DR intersect in the duty ratios Du, Dv, Dw, and is greater than the smaller value of the values of the duty ratio DR at the point where the waveforms of the two duty ratios DR intersect. In the example of FIG. 6, the threshold TH is 60%.

In the case of FIG. 6, at a certain time t, two duty ratios DR among the duty ratios Du, Dv, Dw become greater than the threshold TH. As an example, in a period PH of FIG. 6, the duty ratio Dv and the duty ratio Dw are greater than the threshold TH. In the period PH, the duty ratio Du is smaller than the threshold TH. When the two duty ratios DR greater than the threshold TH exist in this manner, the controller 21 calculates the control current value based on the phase current value of one phase in which the duty ratio DR is less than or equal to the threshold TH in the three-phase currents and the phase current value of one phase in which the duty ratio DR is greater than the threshold TH in the second feedback control. For example, in the period PH, the controller 21 calculates the second control current value Ic2 based on the third phase current Iw in which the duty ratio DR becomes the duty ratio Dw and the first phase current Iu in which the duty ratio DR becomes the duty ratio Du. Even in such the case, the second control current value Ic2 can be accurately calculated when the current value can be suitably detected by the shunt resistor 15 or the like at the maximum value of the duty ratio Dw within the period PH.

As illustrated in the modification of FIG. 6, the threshold TH is set to a value smaller than the maximum duty ratio DR at which the current value can be suitably detected by the shunt resistor 15 or the like, so that the second feedback control can be executed when the duty ratio DR becomes somewhat large. Thus, even when an error is generated in each of the duty ratios Du, Dv, Dw, the value of the duty ratio DR used for the calculation of the control current value is easily prevented from becoming a value at which the current value cannot be suitably detected.

As illustrated in FIG. 6, the controller 21 in the motor control device 20 of the modification also calculates the control current value based on the phase current values of the other two phases at the timing when the phase current value of one phase in the three-phase currents becomes greater than the threshold TH from the threshold or less in the second feedback control. The motor control device 20 of the modification executes the first feedback control and the second feedback control while switching between the first feedback control and the second feedback control even when the duty phase greater than or equal to the threshold becomes two phases.

For example, all or a part of the component of the controller 21 described above is implemented by a processor such as a CPU that executes a program (software) stored in the storage 22. Some or all of the functions of these components may be implemented by hardware (including circuitry) such as LSI, ASIC, FPGA, or GPU, or may be implemented by cooperation of software and hardware.

The program may be previously stored in a storage device such as an HDD or a flash memory, stored in a removable storage medium such as a DVD or a CD-ROM, and installed by attaching the storage medium to a drive device. For example, the storage 22 is implemented by a storage medium such as a RAM, a ROM, an HDD, or a flash memory.

While one example embodiment of the present disclosure has been described above, the present disclosure is not limited to the example embodiment, but can be appropriately modified without departing from the gist thereof. For example, although the motor control device 20 uses the dq-axis current as the control current value, three-phase current values may be used as the control current value.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device to control a motor by adjusting a three-phase current including a first phase current, a second phase current, and a third phase current, the motor control device comprising:
a controller configured or programmed to control the three-phase current by feeding back a control current value obtained based on the three-phase current; wherein
the controller is configured or programmed to:
execute a first feedback control of feeding back any one of a first control current value calculated based on the second phase current and the third phase current, a second control current value calculated based on the third phase current and the first phase current, and a third control current value calculated based on the first phase current and the second phase current as the control current value;
execute a second feedback control in which the first control current value, the second control current value, and the third control current value are switched and fed back as the control current value;
execute the first feedback control when a duty ratio of a pulse wave that generates each of the first phase current, the second phase current, and the third phase current changes within a range less than or equal to predetermined threshold; and
execute the second feedback control when at least one of the duty ratios of the pulse waves that generate the first phase current, the second phase current, and the third phase current changes within a range including a value greater than the predetermined threshold.

2. The motor control device according to claim 1, wherein the controller is configured or programmed to calculate the control current value based on a two-phase phase current value in which the duty ratio is less than or equal to the threshold among the three-phase currents in the second feedback control.

3. The motor control device according to claim 1, wherein in the second feedback control, the controller is configured or programmed to calculate the control current value based on a phase current value of one phase in which the duty ratio is less than or equal to the threshold and a phase current value of one phase in which the duty ratio is greater than the threshold among the three-phase currents.

4. The motor control device according to claim 1, wherein the control current value is a dq-axis current value obtained by converting the three-phase current into two axes corresponding to a d-axis and a q-axis orthogonal to the d-axis.

5. The motor control device according to claim 1, wherein in the second feedback control, the controller is configured or programmed to correct the control current value based on a difference between the first control current value, the second control current value, and the third control current value.

6. The motor control device according to claim 5, wherein the controller is configured or programmed to calculate the first control current value, the second control current value, and the third control current value during execution of the first feedback control, and acquires the difference.

7. A motor comprising the motor control device according to claim 1.

8. A motor control method of controlling a motor by adjusting a three-phase current including a first phase current, a second phase current, and a third phase current, the motor control method comprising:
controlling the three-phase current by feeding back a control current value obtained based on the three-phase current; wherein
the controlling the three-phase current includes:
executing a first feedback control of feeding back any one of a first control current value calculated based on the second phase current and the third phase current, a second control current value calculated based on the third phase current and the first phase current, and a third control current value calculated based on the first phase current and the second phase current as the control current value;

executing a second feedback control in which the first control current value, the second control current value, and the third control current value are switched and fed back as the control current value;

executing the first feedback control when a duty ratio of a pulse wave that generates each of the first phase current, the second phase current, and the third phase current changes within a range less than or equal to a predetermined threshold; and executing the second feedback control when at least one of the duty ratios of the pulse waves that generate the first phase current, the second phase current, and the third phase current changes within a range including a value greater than the predetermined threshold.

* * * * *